(12) United States Patent
Toyoda et al.

(10) Patent No.: US 7,547,030 B2
(45) Date of Patent: Jun. 16, 2009

(54) SUPPORT SECTION STRUCTURE FOR A SWING ARM

(75) Inventors: Hidetoshi Toyoda, Saitama (JP); Yutaka Nakanishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 11/699,480

(22) Filed: Jan. 30, 2007

(65) Prior Publication Data
US 2007/0176393 A1 Aug. 2, 2007

(30) Foreign Application Priority Data
Jan. 31, 2006 (JP) .............................. 2006-023008

(51) Int. Cl.
*B62K 11/00* (2006.01)
(52) U.S. Cl. ........................ 280/286; 280/277; 180/227
(58) Field of Classification Search ................ 180/277, 180/227; 280/277, 286
See application file for complete search history.

(56) References Cited

U.S. PATENT DOCUMENTS 6,073,719 A * 6/2000 Ohmika et al. .............. 180/219

2006/0151226 A1 * 7/2006 Misaki et al. ................ 180/227

FOREIGN PATENT DOCUMENTS

JP 2002-87364 A 3/2002

* cited by examiner

*Primary Examiner*—Paul N Dickson
*Assistant Examiner*—Tashiana Adams
(74) *Attorney, Agent, or Firm*—Birch, Stewart, Kolasch & Birch, LLP

(57) ABSTRACT

A support section structure for a swing arm provides a well-balanced state for the weight of the vehicle in a widthwise direction and for efficiently increasing the rigidity of a vehicle body frame without inviting a significant increase in the weight of the vehicle body. A swing arm is provided for supporting a rear wheel Wr for rotation and is supported for a rocking motion on a center frame. An output power shaft of a power source is transmitted to the rear wheel Wr through a drive shaft. A left outer side frame and a intermediate frame, which support a front end portion of the swing arm for pivotal motion, are provided on the center frame. A right outer side frame disposed on the outer side in the vehicle widthwise direction with respect to the drive shaft on the intermediate frame is provided integrally against removal on the center frame.

20 Claims, 4 Drawing Sheets

SUPPORT SECTION STRUCTURE FOR A SWING ARM

CROSS-REFERENCE TO RELATED APPLICATIONS

The present application claims priority under 35 USC 119 to Japanese Patent Application No. 2006-023008 filed on Jan. 31, 2006 the entire contents of which are hereby incorporated by reference.

BACKGROUND OF THE INVENTION

1. Field of the Invention

This invention relates to a support section structure for a swing arm for supporting a rear wheel of a motorcycle for a rocking motion in upward and downward directions.

2. Description of Background Art

Some motorcycles adopt a drive shaft as a transmission section for providing power from an engine mounted on the motorcycle.

In the motorcycle which adopts the drive shaft, an output power shaft of the engine carried on a vehicle body frame and the drive shaft supported on a swing arm are connected to each other through a universal joint. Since the universal joint section is bent in response to an upward or downward rocking motion of the swing arm, the universal joint is disposed coaxially on a pivotally supporting shaft for the swing arm.

As one of support section structures for a swing arm of such a motorcycle described above, a support section structure is known wherein a pair of pivotally supporting walls are provided in a spaced relationship from each other in the vehicle widthwise direction at positions of a vehicle body frame on the rearward side of an engine and a swing arm is supported at a front end portion thereof between the pivotally supporting walls while a drive shaft (universal joint) is disposed on the outer side of one of the pivotally supporting walls in the vehicle widthwise direction. See, Japanese Patent Laid-Open No. 2002-87364. In this instance, since the drive shaft is disposed on the outer side in the vehicle widthwise direction with respect to the pivotally supporting shaft for the swing arm, a front end portion of the swing arm is supported on the vehicle body frame in such a relationship that it is displaced to one of the left and right sides of the vehicle body frame (on the side opposite to the drive shaft). In addition, on the vehicle body frame side, a pair of pivotally supporting walls are formed in a displaced relationship to one of the left and right sides. It is to be noted that, in the case of the support section structure for a swing arm disclosed in Japanese Patent Laid-Open No. 2002-87364, a cover member for covering the outer sides of the drive shaft in the vehicle widthwise direction is removably mounted on the vehicle body frame.

However, with the conventional support section structure for a swing arm, it is difficult to sufficiently assure the distance between the pair of pivotally supporting walls of the vehicle body frame on the opposite sides because the pivotally supporting walls are displaced to one side in the vehicle widthwise direction and the drive shaft is disposed at a side portion of one of the pivotally supporting walls. Thus, in order to support the front end portion of the swing arm with high rigidity, it cannot be avoided to form the pivotally supporting walls in an increased size by increasing the thickness of the pivotally supporting walls or by a similar means. If the pivotally supporting walls have an increased size, then an additional member must be provided or an existing part must be formed which results in an increase in the thickness in order to adjust the weight balance in the leftward and rightward directions of the vehicle body with respect to the pivotally supporting walls of the increased size. As a result, there is the possibility that the weight of the entire vehicle body may be increased.

Further, in the case of the support section structure for a swing arm disclosed in Japanese Patent Laid-Open No. 2002-87364, while a cover member which covers the outer sides of the drive shaft in the vehicle widthwise direction is mounted on the vehicle body frame, this cover member is a removable cover member for the maintenance and does not contribute to an enhancement of the rigidity of the vehicle body frame.

SUMMARY AND OBJECTS OF THE INVENTION

Therefore, the present invention contemplates the provision of a support section structure for a swing arm which can achieve a well-balanced state with respect to the weight of the vehicle in a widthwise direction and can efficiently increase the rigidity of a vehicle body frame without inviting a significant increase in the weight of the vehicle body.

As a means for solving the problems described above, according to an embodiment of the present invention, a support section structure for a swing arm is provided in a motorcycle wherein a swing arm 12 on which a rear wheel Wr is supported for rotation and is supported for rocking motion in upward and downward directions on a vehicle body frame 2. In addition, power from a power source mounted on the body frame is transmitted to the rear wheel through a drive shaft 14 with a pair of pivotally supporting walls, for example, a left outer side frame 20 and an intermediate frame 24, for supporting a front end portion of the swing arm for a rocking motion in upward and downward directions being provided in a spaced relationship from each other in a vehicle widthwise direction on the body frame. The drive shaft is disposed on the outer side of one of the pivotally supporting walls in the vehicle widthwise direction. A reinforcing wall, for example, a right outer side frame 21, for reinforcing the pivotally supporting wall on the drive shaft side is disposed at a position on the outer side in the vehicle widthwise direction with respect to the pivotally supporting wall on the outer side with respect to the drive shaft.

Consequently, the pair of pivotally supporting walls of the vehicle body frame are reinforced efficiently by the reinforcing wall provided integrally at the position on the outer side in the vehicle widthwise direction with respect to the drive shaft. In addition, the leftward and rightward balance in weight of the vehicle body is maintained by the reinforcing wall and the other pivotally supporting wall.

According to an embodiment of the present invention, the support section structure for a swing arm is configured such that the pivotally supporting wall on the drive shaft side is provided in such a manner so as to cross the vehicle body center line L in the vehicle widthwise direction. A rear shock absorber 27 is provided for moderating a rocking shock of the swing arm and is connected to the pivotally supporting wall on the drive shaft side.

Consequently, the rear shock absorber is positioned at the center in the vehicle widthwise direction, and the leftward and rightward balance of the vehicle body is maintained in a favorably disposition. Further, a load inputted from the rear shock absorber is positively received by the one pivotally supporting wall at the central position of the vehicle body frame in the vehicle widthwise direction.

According to an embodiment of the present invention, the support section structure for a swing arm is configured such that a seat supporting member, for example, seat rails 9 and seat stays 10, is provided on the vehicle body frame and extends to the rearward side of the vehicle body. A battery 11 is supported on the seat supporting member. The battery and the rear shock absorber are disposed in the proximity of a central portion in the forward and rearward direction of the vehicle body such that at least a part thereof as viewed in a top plan view are juxtaposed with each other across the center line of the vehicle body in the widthwise direction.

Consequently, the battery and the rear shock absorber, which are heavy members, are concentrated at a central position in the forward and rearward direction of the vehicle body. The two members are distributed in a well-balanced state to the left and right in the vehicle widthwise direction.

According to an embodiment of the present invention, the support section structure for a swing arm is configured such that an upper side cross member, for example, an upper side cross member 22, and a lower side cross member, for example, a lower side cross member 23, are provided on the vehicle body frame so as to interconnect upper portions and lower portions, respectively, of the pair of pivotally supporting walls and the reinforcing wall. In addition, the lower side cross member is disposed in an offset relationship in the rearward direction of the vehicle body from the upper side cross member as viewed in a side elevation. Further, the rear shock absorber, for moderating a rocking shock of the swing arm, is supported between a portion in the proximity of the upper side cross member and a portion in the proximity of the lower side cross member.

Consequently, the rear shock absorber is disposed such that a lower end portion thereof is inclined to the rearward side.

According to an embodiment of the present invention, since the pivotally supporting wall can be reinforced efficiently while the leftward and rightward balance of the vehicle body with the pivotally supporting walls is maintained by the reinforcing wall provided integrally on the vehicle body frame, an enhancement of the rigidity of the vehicle body frame can be achieved without inviting a significant increase in the weight of the vehicle body.

According to an embodiment of the present invention, since the rear shock absorber which is a heavy member is disposed in the proximity of the center in the vehicle widthwise direction and a load inputted from the rear shock absorber is received with certainty by that one of the pivotally supporting walls which is substantially at the center of the vehicle body frame, the vehicle balance and the motion performance of the vehicle can be efficiently raised.

According to an embodiment of the present invention, since the battery and the rear shock absorber which are heavy members are concentrated at the central position in the forward and rearward direction of the vehicle body and are distributed with a good balance to the left and right in the vehicle widthwise direction, the vehicle balance can be further improved.

According to an embodiment of the present invention, since the rear shock absorber can be disposed in an inclined relationship by a greater amount with respect to the vertical direction, the impact absorbing stroke of the rear shock absorber can be effectively assured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
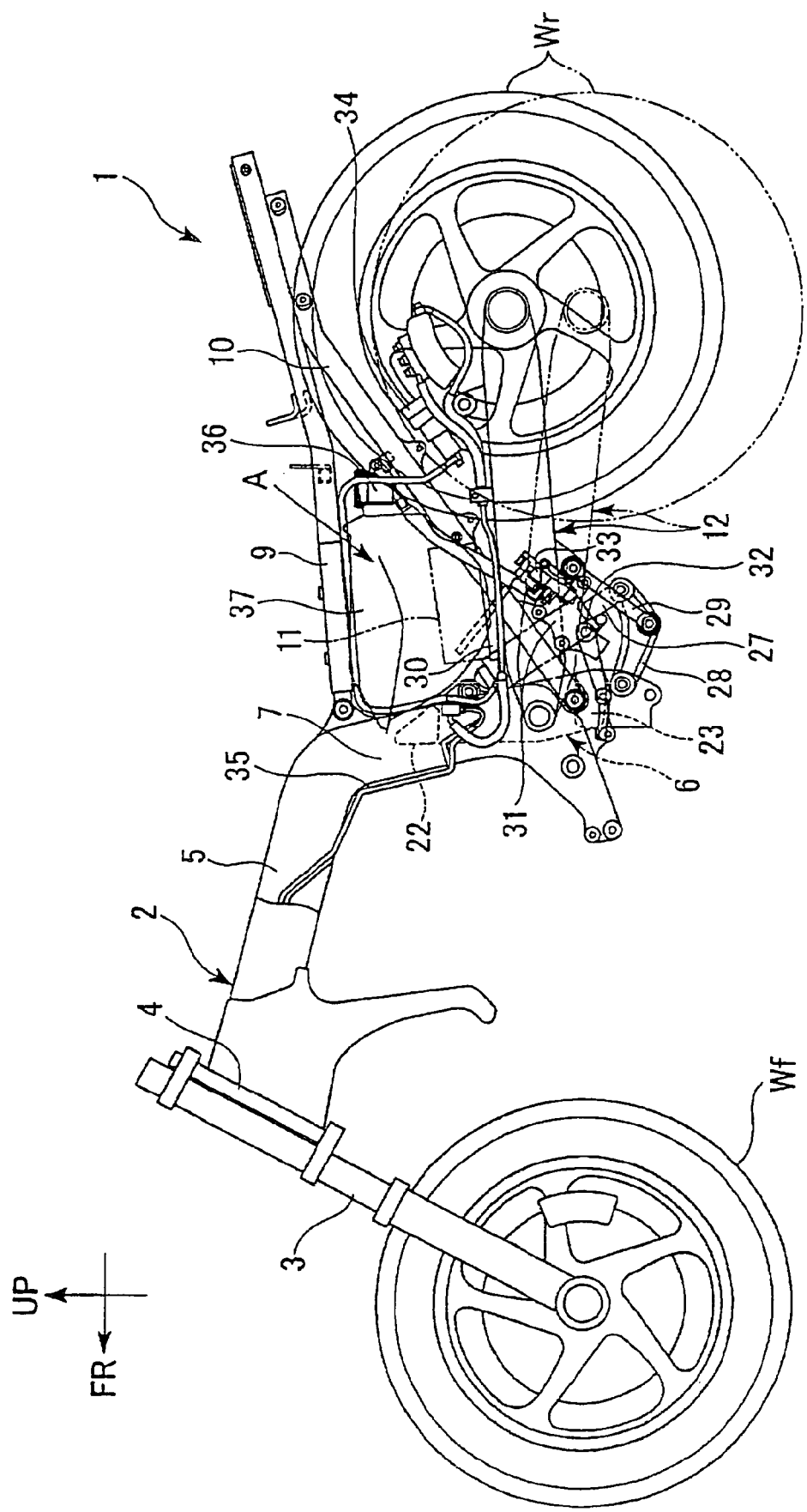
FIG. 1 is a side elevational view of a skeleton section a vehicle body of a motorcycle showing an embodiment of the present invention.

In the following, an embodiment of the present invention is described with reference to the drawings. It is to be noted that, unless otherwise specified, the directions such as forward, rearward, leftward and rightward directions in the following description are the same as those of the vehicle. Further, an arrow mark FR in the figures indicates the forward direction of the vehicle, and another arrow mark UP indicates the upward direction of the vehicle.

A motorcycle 1 of the present embodiment includes a vehicle body frame 2 whose principal portion is formed from a head pipe 4 which supports a front fork 3 at a front end portion of the vehicle body frame 2. A pair of side frames 5 extend rearwardly of the vehicle body in a leftwardly and rightwardly bifurcated fashion in the vehicle widthwise direction from the head pipe 4. A center frame 6 interconnects the two side frames 5 at rear end portions of the side frames 5.

Each of the side frames 5 is bent in a substantially L shape such that a rear end portion thereof extends downwardly. A power unit not shown includes an engine and a transmission that are carried on the front portion side of the L-shaped bent portions 7. A main fuel tank 8 (refer to FIG. 4) is provided on the upper side of the power unit. Seat rails 9 (seat supporting members) are coupled to the L-shaped bent portions 7 and extend toward the rearward side of the vehicle body. A seat, not shown, is attached to a seat rails 9. A swing arm 12 is supported on the center frame 6 and supports a rear wheel Wr for rotation while a front wheel Wf is supported on the front fork 3. Further, in the motorcycle 1, an output power shaft 13 of the power unit and a power transmission portion of the rear wheel Wr are connected to each other by a drive shaft 14.

The swing arm 12 includes a left rear fork block 12a for supporting a left end of a rear wheel axle 15 for rotation and a right rear fork block 12b for supporting a right end of the rear wheel axle 15 for rotation. The left rear fork block 12a and the right rear fork block 12b are coupled on the front end side thereof to a cylindrical pivot shaft 12d together with a connecting piece 12c. The pivot shaft 12d is a portion supported for a rocking motion on the center frame 6, and is provided in a generally displaced relationship to the left side with respect to the vehicle body center line L in the widthwise direction and has an axial line extending in the vehicle widthwise direction.

The right rear fork block 12b has a tubular wall 16 provided at a right side end portion thereof and extends along a forward and rearward direction of the vehicle body. The drive shaft 14 is accommodated in the inside of the tubular wall 16. The drive shaft 14 projects at one end portion thereof to the forward side of the vehicle body from a front end portion of the tubular wall 16 and is connected to the output power shaft 13 of the power unit through a universal joint 17. The universal joint 17 is disposed coaxially with the pivot shaft 12d at the right side position of the vehicle body with respect to the pivot shaft 12d. Further, a gear case 18 is provided integrally at a rear end portion of the right rear fork block 12b, and the drive shaft 14 is held in engagement at the other end portion thereof with the rear wheel axle 15 for transmission of power through a bevel gear mechanism 19 in the gear case 18.

Figure 2:
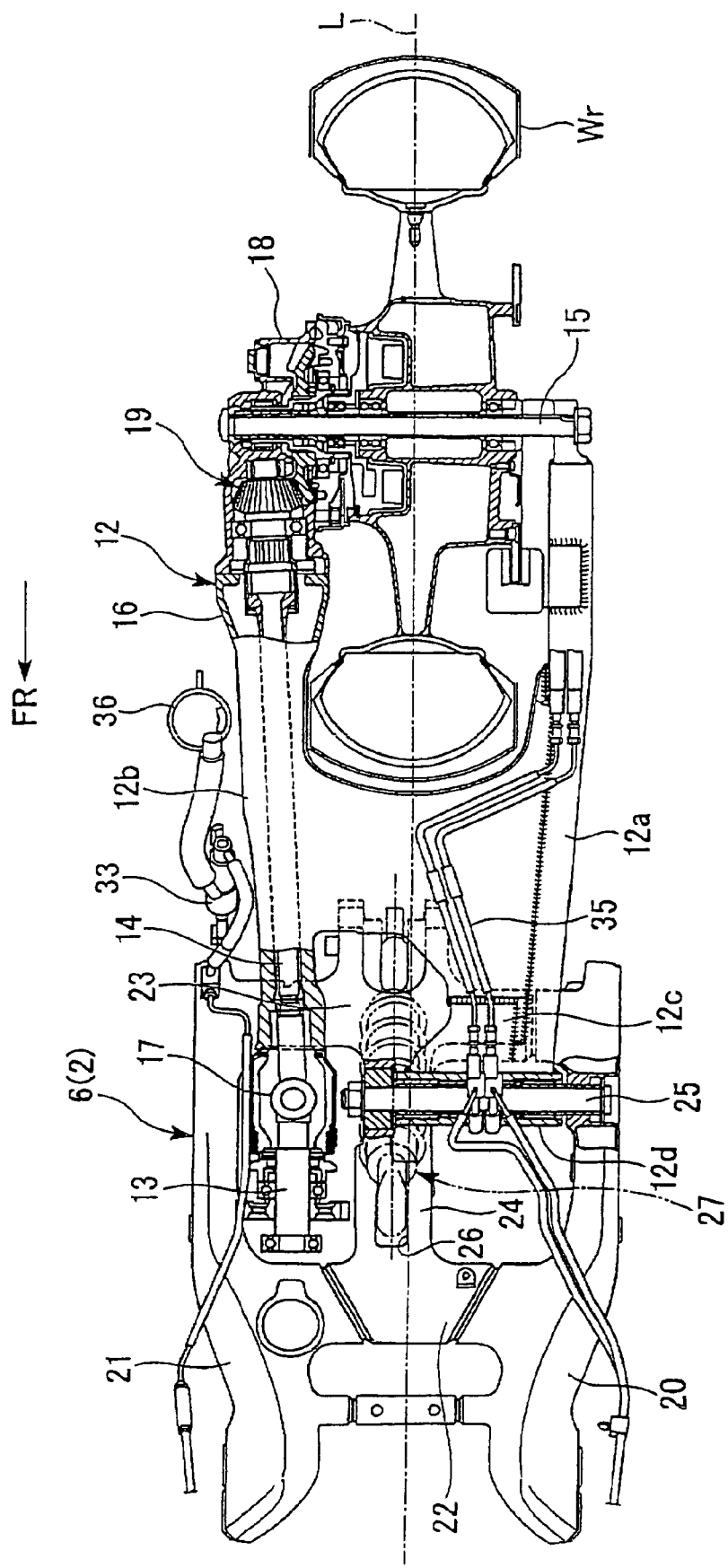
FIG. 2 shows the embodiment and is a view as viewed in the direction of an arrow mark A showing part of FIG. 1 in section.
Figure 3:
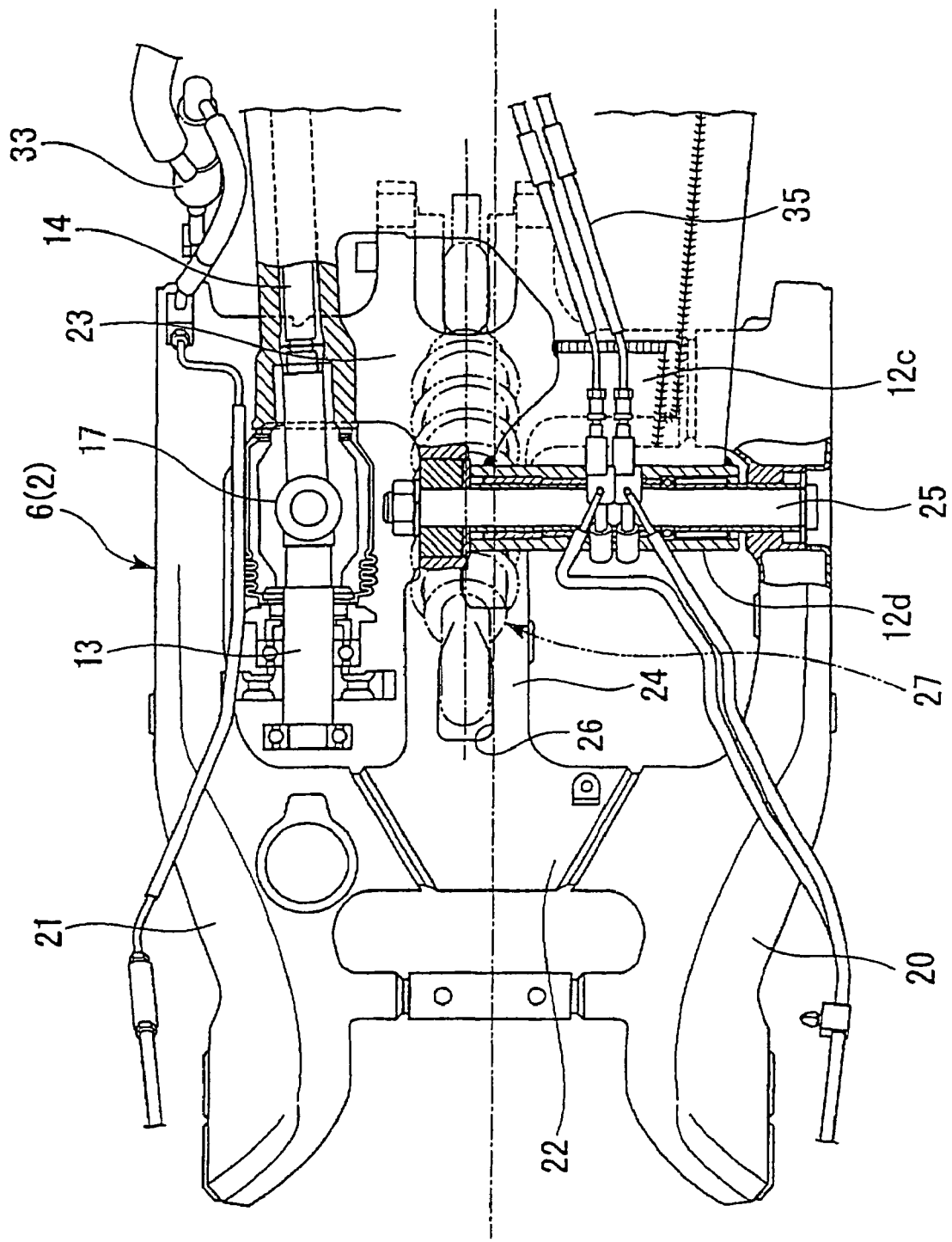
FIG. 3 shows the embodiment and is an enlarged view of essential part of FIG. 2.

The center frame 6 which couples rear portions of the left and right side frames 5 includes, as shown in FIGS. 2 and 3, outside frames 20, 21 coupled to the left and right side frames 5, respectively, an upper side cross member 22 and a lower side cross member 23 for connecting upper portions and lower portions of the left and right outside frames 20, 21, respectively. In addition, an intermediate frame 24 is coupled to substantially intermediate positions of the upper side cross member 22 and the lower side cross member 23 in the vehicle widthwise direction. The pivot shaft 12d for the swing arm 12 is interposed between the outer side frame 20 on the left side (hereinafter referred to as "left outer side frame 20") and the intermediate frame 24. The pivot shaft 12d is supported for rotation on the left outer side frame 20 and the intermediate frame 24 through a support bolt 25. In addition, the universal joint 17 is disposed between the intermediate frame 24 and the outer side frame 21 on the right side (hereinafter referred to as "right outer side frame 21") and connects the output power shaft 13 of the power unit and the drive shaft 14 to each other. In the case of the present embodiment, the left outer side frame 20 and the intermediate frame 24 form a pair of pivotally supporting walls configured to support the swing arm 12 for a rocking motion. In addition, the right outer side frame 21 forms a reinforcing wall configured to reinforce the pivotally supporting walls (20, 24) at an outer side position in the vehicle widthwise direction with respect to the drive shaft 14 of the pivotally supporting wall (24). It is to be noted that, while precisely the intermediate frame 24 is disposed at a position a little displaced to the right side with respect to the mid position between the left outer side frame 20 and the right outer side frame 21, at least part of the intermediate frame 24 in the widthwise direction crosses the vehicle body center line L.

Further, while the left outer side frame 20, intermediate frame 24 and right outer side frame 21 which form the center frame 6 are finally integrated against removal through the upper side cross member 22 and the lower side cross member 23, the principal elements mentioned are cast separately in roughly three blocks, a left side block, a central block and a right side block, and the blocks are coupled to each other by welding after they are cast. It is to be noted that, in the case of the present embodiment, the central block has an I shape as viewed in a top plan view wherein part of the upper side cross member 22 and the lower side cross member 23 are integrated on and under the intermediate frame 24.

A slit 26 is provided at an upper side position of the intermediate frame 24 with respect to the pivotally supporting portion of the swing arm 12, and an upper end portion of a rear shock absorber 27 for moderating a rocking impact of the swing arm 12 that is supported for pivotal motion in the slit 26. The slit 26, which is a pivotally supporting portion for the upper portion side of the rear shock absorber 27, is provided in the proximity of the vehicle body center line L.

The rear shock absorber 27 of the present motorcycle forms a suspension of the Pro-Link type wherein the rear shock absorber 27 is supported at a lower end portion thereof by a lower end of the intermediate frame 24 through a delta-shaped link 28 while the link 28 is connected and supported at an intermediate portion thereof to and by a portion of the swing arm 12 from an intermediate portion to a lower face of a front end portion of the same through a connecting rod 29. Accordingly, the rear shock absorber 27 is supported at upper and lower end portions thereof to the center frame 6. An input load of a rocking motion of the swing arm 12 is inputted to the rear shock absorber 27 through the connecting rod 29 and the link 28.

Meanwhile, the center frame 6 is coupled to a rear end portion (L-shaped bent portions 7) of the side frames 5 in such a manner that the lower side cross member 23 is offset to the rearward side of the vehicle body with respect to the upper side cross member 22. Therefore, a lower end portion side of the rear shock absorber 27 supported by the lower end of the center frame 6 through the link 28 on the lower side the swing arm 12 is offset by a great amount toward the vehicle body rearward side with respect to the upper end portion side of the rear shock absorber 27 which is supported for pivotal motion in the slit 26 on the upper portion side of the center frame 6. Accordingly, in the present motorcycle, since the rear shock absorber 27 is inclined by a great amount from the vertical direction, a sufficiently long impact absorbing stroke can be assured for the rear shock absorber 27.

Figure 4:
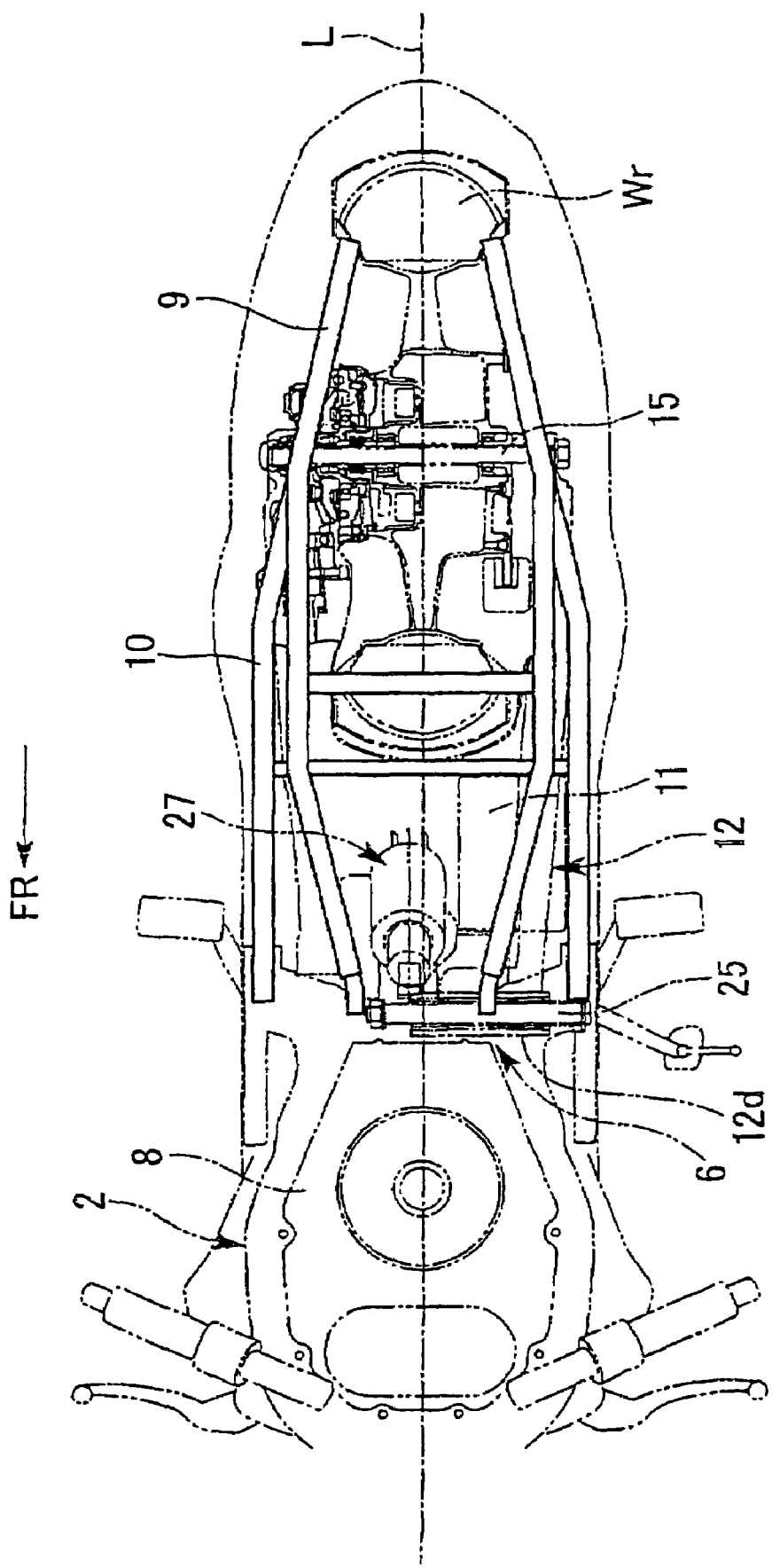
FIG. 4 shows the embodiment and is a plan view particularly showing seat rails and seat stays.

Seat stays 10 (seat supporting members) are coupled to the side faces of the lower portion side of the center frame 6 and extend rearwardly and upwardly of the vehicle body. The seat stays 10 are coupled at a rear end portion thereof to the lower face of the seat rails 9. While the seat stays 10 are members which reinforce the seat rails 9 from below. A battery 11 is attached to the seat stays 10 through a bracket 30. The battery 11 is disposed at a substantially central position in the forward and rearward direction of the vehicle body together with the rear shock absorber 27. Further, the two members 11 and 27 are disposed such that they are juxtaposed at least part thereof with each other across the vehicle body center line L in the widthwise direction as viewed in top plan as seen in FIG. 4.

Further, a foot receiving step 32 is attached in the proximity of lower end portions of the seat stays 10 through a bracket 31, and a brake master cylinder 33 is attached to a rear end portion of the bracket 31.

It is to be noted that, in FIGS. 1 and 2, a hydraulic preload adjuster 34 is provided for adjusting the preload of the rear shock absorber 27. A piping 35 is provided for the front and rear interlocked brakes. Further, a reserve tank 36 is provided for reserving brake oil to be supplied to the brake master cylinder 33. An auxiliary fuel tank 37 is disposed between the seat rails 9 and the seat stays 10.

In the motorcycle 1, since the right outer side frame 21, which covers the right outer side of the drive shaft 14, is provided integrally against removal on the center frame 6, which forms the vehicle body frame 2, together with the left outer side frame 20 and the intermediate frame 24 which support the front end portion (pivotally supporting shaft) of the swing arm 12 for pivotal motion as described above, the rigidity of the entire vehicle body frame 2 can be raised by the right outer side frame 21 without increasing the thickness of the left outer side frame 20 and the intermediate frame 24 on which the swing arm 12 is supported for pivotal motion. Further, in the case of the present motorcycle 1, since the right outer side frame 21 is disposed substantially symmetrically with the left outer side frame 20 with respect to the intermediate frame 24 which crosses the vehicle body center line L in the widthwise direction, the rigidity of the vehicle body frame 2 can be efficiently raised while the left and right weight balance of the vehicle body is kept without additionally providing a member for obtaining the weight balance or the like.

Further, in the present motorcycle 1, since the rear shock absorber 27 is supported at an upper end portion thereof for pivotal motion on the intermediate frame 24 substantially at the center in the widthwise direction of the vehicle body frame 2, the rear shock absorber 27 which is a heavy member is disposed at a substantially center position in the forward and rearward direction and the leftward and rightward direction of the vehicle body. This makes the weight balance of the vehicle better. Further, in the case of the motorcycle of the present invention, since a load inputted from the rear shock absorber 27 is received directly by the intermediate frame 24 at the center of the vehicle body frame 2, the motion performance of the vehicle rises with certainty.

Further, in the case of the motorcycle 1 of the present embodiment, since the battery 11 is attached to the seat stays 10, which extend to the rearward side of the vehicle from the center frame 6, through the bracket 30 such that it is positioned substantially at the center in the forward and rearward direction of the vehicle body, the battery 11, which is a heavy member, is concentrated at a central portion of the vehicle together with the rear shock absorber 27. This makes the weight balance in the forward and rearward direction of the vehicle better.

Furthermore, in the case of the motorcycle 1 of the present invention, since the battery 11 and the rear shock absorber 27 are disposed such that at least a part thereof is juxtaposed across the vehicle body center line L as viewed in top plan, the rear shock absorber 27 and the battery 11, which are heavy members, are distributed in good balance to the left and right of the vehicle body. This makes the leftward and rightward balance of the vehicle even better.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A support section structure for a swing arm provided in a motorcycle comprising:
    a swing arm for supporting a rear wheel for rotation and for a rocking motion in upward and downward directions on a vehicle body frame;
    power from a power source operatively mounted on said body frame is transmitted to said rear wheel through a drive shaft;
    a pair of pivotally supporting walls for supporting a front end portion of said swing arm for a rocking motion in upward and downward directions is provided in a spaced relationship from each other in a vehicle widthwise direction on said body frame, one of the two pivotally supporting walls being an intermediate frame arranged to cross a vehicle body center line (L) in the vehicle widthwise direction;
    said drive shaft being disposed on an outer side of said intermediate frame in the vehicle widthwise direction; and
    a reinforcing wall for reinforcing the intermediate shaft is disposed at a position on an outer side in the vehicle widthwise direction with respect to the intermediate frame and is provided integrally against removal on said vehicle body frame.

2. The support section structure for the swing arm according to claim 1, wherein
    a rear shock absorber for moderating a rocking shock of said swing arm is connected to the pivotally supporting wall on said drive shaft side.

3. The support section structure for the swing arm according to claim 2, wherein:
    a seat supporting member is provided on said vehicle body frame and extends to the rearward side of said vehicle body;
    a battery is supported on said seat supporting member; and
    said battery and said rear shock absorber are disposed in the proximity of a central portion in the forward and rearward direction of said vehicle body such that at least part thereof as viewed in top plan view are juxtaposed with each other across the center line (L) of said vehicle body in the widthwise direction.

4. The support section structure for the swing arm according to claim 1, wherein:
    an upper side cross member and a lower side cross member are provided on said vehicle body frame so as to interconnect upper portions and lower portions, respectively, of said pair of pivotally supporting walls and said reinforcing wall;
    said lower side cross member is disposed in an offset relationship in the rearward direction of said vehicle body from said upper side cross member as viewed in side elevation; and
    a rear shock absorber for moderating a rocking shock of said swing arm is supported between a portion in the proximity of said upper side cross member and a portion in the proximity of said lower side cross member.

5. The support section structure for the swing arm according to claim 2, wherein:
    an upper side cross member and a lower side cross member are provided on said vehicle body frame so as to interconnect upper portions and lower portions, respectively, of said pair of pivotally supporting walls and said reinforcing wall;
    said lower side cross member is disposed in an offset relationship in the rearward direction of said vehicle body from said upper side cross member as viewed in side elevation; and
    said rear shock absorber for moderating a rocking shock of said swing arm is supported between a portion in the proximity of said upper side cross member and a portion in the proximity of said lower side cross member.

6. The support section structure for the swing arm according to claim 1, and further including a pivot shaft for mounting said swing arm, said pivot shaft being interposed between the pair of pivotally supporting walls.

7. The support section structure for the swing arm according to claim 6, wherein:
    an upper side cross member and a lower side cross member are provided on said vehicle body frame so as to interconnect upper portions and lower portions, respectively, of said pair of pivotally supporting walls and said reinforcing wall;
    wherein said pivot shaft interposed between the pair of pivotally supporting walls is disposed between said upper cross member and said lower side cross member.

8. The support section structure for the swing arm according to claim 1, and further including a universal joint operatively connected between the power source and the drive shaft, said universal joint being positioned between one of the pair of pivotally supporting walls and the reinforcing wall.

9. The support section structure for the swing arm according to claim 1, wherein the pair of pivotally supporting walls is formed by an outer side frame and the intermediate frame for supporting the swing arm for rocking motion.

10. The support section structure for the swing arm according to claim 1, and further including a slit formed in an upper portion of said intermediate frame wherein an upper end portion of a shock absorber is supported for pivotal movement in the slit.

11. A support section structure for a swing arm adapted to be used with a motorcycle comprising:
    a vehicle body frame;
    a swing arm for supporting a rear wheel for rotation and for a rocking motion in upward and downward directions on said vehicle body frame;
    a pair of pivotally supporting walls for supporting a front end portion of said swing arm for a rocking motion in upward and downward directions,
    said pair of pivotally supporting walls being provided in a spaced relationship from each other in a vehicle widthwise direction on said body frame, and one of the pair of pivotally supporting walls being an intermediate frame arranged to cross a vehicle body center line (L) in the vehicle widthwise direction; and
    a reinforcing wall for reinforcing the intermediate frame, said reinforcing wall being disposed at a position on the outer side in the vehicle widthwise direction with respect to the intermediate frame and being provided integrally against removal on the vehicle body frame.

12. The support section structure for the swing arm according to claim 11, wherein the one of the pivotally supporting walls is provided to cross the vehicle body center line (L) in the vehicle widthwise direction; and
    a rear shock absorber for moderating a rocking shock of said swing arm is connected to one of the pivotally supporting walls.

13. The support section structure for the swing arm according to claim 12, wherein:
    a seat supporting member is provided on said vehicle body frame and extends to the rearward side of said vehicle body;
    a battery is supported on said seat supporting member; and
    said battery and said rear shock absorber are disposed in the proximity of a central portion in the forward and rearward direction of said vehicle body such that at least part thereof as viewed in top plan view are juxtaposed with each other across the center line of said vehicle body in the widthwise direction.

14. The support section structure for the swing arm according to claim 11, wherein:
    an upper side cross member and a lower side cross member are provided on said vehicle body frame so as to interconnect upper portions and lower portions, respectively, of said pair of pivotally supporting walls and said reinforcing wall;
    said lower side cross member is disposed in an offset relationship in the rearward direction of said vehicle body from said upper side cross member as viewed in side elevation; and
    a rear shock absorber for moderating a rocking shock of said swing arm is supported between a portion in the proximity of said upper side cross member and a portion in the proximity of said lower side cross member.

15. The support section structure for the swing arm according to claim 12, wherein:
    an upper side cross member and a lower side cross member are provided on said vehicle body frame so as to interconnect upper portions and lower portions, respectively, of said pair of pivotally supporting walls and said reinforcing wall;
    said lower side cross member is disposed in an offset relationship in the rearward direction of said vehicle body from said upper side cross member as viewed in side elevation; and
    said rear shock absorber for moderating a rocking shock of said swing arm is supported between a portion in the proximity of said upper side cross member and a portion in the proximity of said lower side cross member.

16. The support section structure for the swing arm according to claim 11, and further including a pivot shaft for mounting said swing arm, said pivot shaft being interposed between the pair of pivotally supporting walls.

17. The support section structure for the swing arm according to claim 16, wherein:
    an upper side cross member and a lower side cross member are provided on said vehicle body frame so as to interconnect upper portions and lower portions, respectively, of said pair of pivotally supporting walls and said reinforcing wall;
    wherein said pivot shaft interposed between the pair of pivotally supporting walls is disposed between said upper cross member and said lower side cross member.

18. The support section structure for the swing arm according to claim 11, and further including a power source and a drive shaft for transmitting rotation from said power source to said rear wheel, a universal joint being operatively connected between the power source and the drive shaft, said universal joint being positioned between one of the pair of pivotally supporting walls and the reinforcing wall.

19. The support section structure for the swing arm according to claim 11, wherein the pair of pivotally supporting walls is formed by an outer side frame and the intermediate frame for supporting the swing arm for rocking motion.

20. The support section structure for the swing arm according to claim 11, and further including a slit formed in an upper portion of said intermediate frame wherein an upper end portion of a shock absorber is supported for pivotal movement in the slit.

* * * * *